(12) United States Patent
Helgason et al.

(10) Patent No.: US 12,389,929 B2
(45) Date of Patent: Aug. 19, 2025

(54) BITTER TASTE MASKING OF PEPTIDES

(71) Applicant: BASF SE, Ludwigshafen am Rhein (DE)

(72) Inventors: Thrandur Helgason, Illertissen (DE); Selina Marz, Illertissen (DE); Jochen Kutscher, Illertissen (DE)

(73) Assignee: BASF SE, Ludwigshafen Am Rhein (DE)

( * ) Notice: Subject to any disclaimer, the term of this patent is extended or adjusted under 35 U.S.C. 154(b) by 876 days.

(21) Appl. No.: 17/288,290

(22) PCT Filed: Aug. 30, 2019

(86) PCT No.: PCT/EP2019/073201
§ 371 (c)(1),
(2) Date: Apr. 23, 2021

(87) PCT Pub. No.: WO2020/083545
PCT Pub. Date: Apr. 30, 2020

(65) Prior Publication Data
US 2021/0368838 A1 Dec. 2, 2021

(30) Foreign Application Priority Data
Oct. 26, 2018 (EP) ..................... 18202790

(51) Int. Cl.
*A23L 27/21* (2016.01)
*A23L 27/00* (2016.01)

(52) U.S. Cl.
CPC .......... *A23L 27/215* (2016.08); *A23L 27/84* (2016.08); *A23L 27/86* (2016.08)

(58) Field of Classification Search
None
See application file for complete search history.

(56) References Cited

U.S. PATENT DOCUMENTS

| | | | |
|---|---|---|---|
| 5,073,392 A * | 12/1991 | Atwell | A21D 2/08 426/243 |
| 2011/0268680 A1 * | 11/2011 | Zhong | A23L 29/30 435/68.1 |
| 2012/0183672 A1 | 7/2012 | Haraguchi et al. | |
| 2012/0213889 A1 | 8/2012 | Chiang | |
| 2012/0244272 A1 * | 9/2012 | Giuseppin | A23L 33/185 530/395 |
| 2017/0071232 A1 | 3/2017 | Sato | |

FOREIGN PATENT DOCUMENTS

| | | |
|---|---|---|
| CN | 102240025 A | 11/2011 |
| CN | 108094839 A | 6/2018 |
| EP | 2484227 A1 | 8/2012 |
| EP | 3162223 A1 | 5/2017 |
| JP | 08-269095 A | 10/1996 |
| JP | 2011-125329 A | 6/2011 |
| JP | 2013-507122 A | 3/2013 |
| JP | 2016-007200 A | 1/2016 |
| JP | 2017-121198 A | 7/2017 |
| WO | 90/12506 A1 | 11/1990 |
| WO | 2006/137799 A1 | 12/2006 |
| WO | WO-2009117572 A1 * | 9/2009 ............. A23C 21/08 |

OTHER PUBLICATIONS

Bumberger et al., "Bitter taste of enzymic hydrolysates of casein", eitschrift für Lebensmittel-Untersuchung und Forschung, vol. 197, Issue 1, Jul. 1993, pp. 14-19.
Davidek et al., "Simultaneous quantitative analysis of Maillard reaction precursors and products by high-performance anion exchange chromatography", Journal of Agricultural and Food Chemistry, vol. 51, Issue 25, Nov. 7, 2003, pp. 7259-7265.
European Search Report for EP Patent Application No. 18202790.4, Issued on Apr. 12, 2019, 4 pages.
Frister et al., "OPA method modified by use of N, N-dimethyl-2-mercaptoethylammonium chloride as thiol components", Fresenius Zeitschrift Analytical Chemistry, vol. 330, 1988, pp. 631-633.
Hartmann et al., "Food-derived peptides with biological activity: from research to food applications", Current Opinion in Biotechnology, vol. 18, Issue 2, Apr. 2007, pp. 163-169.
International Preliminary Report on Patentability received for PCT Patent Application No. PCT/EP2019/073201, mailed on May 6, 2021, 8 pages.
International Search Report and Written Opinion received for PCT Patent Application No. PCT/EP2019/073201, mailed on Dec. 12, 2019, 10, pages.
Lan et al., "Temperature effect on the non-volatile compounds of Maillard reaction products derived from xylosesoybean peptide system: Further insights into thermal degradation and cross-linking", Food Chemistry, vol. 120, No. 4, Jun. 15, 2010, pp. 967-972.
Lund et al., "Control of Maillard Reactions in Foods: Strategies and Chemical Mechanisms", Journal of Agricultural and Food Chemistry, vol. 65, Issue 23, May 23, 2017, pp. 4537-4552.
Ogasawara et al., "Taste properties of Maillard-reaction products prepared from 1000 to 5000Da peptide", Food Chemistry, vol. 99, No. 3, Jan. 1, 2006, pp. 600-604.

(Continued)

*Primary Examiner* — Lien T Tran
(74) *Attorney, Agent, or Firm* — Faegre Drinker Biddle & Reath LLP

(57) ABSTRACT

Disclosed is a) a conjugated peptide being conjugated with at least one reducing sugar and a degree of conjugation of at least 10 percent, preferably being in solid form such as powders; b) a method for preparing non-bitter conjugated protein hydrolysates comprising hydrolyzing a protein by at least one enzyme, mixing the resulting protein hydrolysate and at least one reducing sugar, heating the mixture to perform a Maillard reaction and drying the composition; c) a method for masking the bitter taste of a peptide comprising mixing a peptide and a reducing sugar, heating the mixture to perform a Maillard reaction and drying to obtain a powder; and d) the use of a conjugated peptide for food products, dietary supplements, pharmaceutical products and animal feed products.

3 Claims, No Drawings

(56) References Cited

OTHER PUBLICATIONS

Pratt et al., "Essential Biochemistry", ed. 3rd Edition, 2013, p. 626.
Tamura et al., "Practical Debittering Using Model Peptides and Related Compounds", Agricultural and Biological Chemistry, vol. 54, Issue 1, Jan. 1, 1990, pp. 41-51.

\* cited by examiner

BITTER TASTE MASKING OF PEPTIDES

CROSS-REFERENCE TO RELATED APPLICATIONS

This application is a national stage application (under 35 U.S.C. § 371) of PCT/EP2019/073201, filed Aug. 30, 2019, which claims benefit of European Application No. 18202790.4, filed Oct. 26, 2018, both of which are incorporated herein by reference in their entirety.

Peptides, either naturally occurring, synthetically made or obtained by acidic, alkaline or enzymatic protein hydrolysis are widely used in the field of nutrition and pharma. Some peptides are bitter and therefore reduce acceptance of the product. The bitter taste is created by specific amino acid sequences which bind to specific bitter receptors on the tongue. Therefore, not all peptides have bitter taste and degree of bitterness depends on different protein sources and different modes of hydrolyzing the proteins (Bumberger E. and Belitz H.-D. 1993). Peptides have become very popular especially as functional ingredient and as a bioactive substance (Hartmann R. and Meisel H. 2007). However, their use currently is limited due to their influence on flavor of the product they are or included in.

Numerous approaches have been taken to reduce bitter taste such as using alpha-cyclodextrin, however a large excess of alpha-cyclodextrin is needed but the effect of bitterness reduction was very limited as the peptides were too large to be screened by the alpha-cyclodextrin (Tamura M. et al. 1990). Starch has also been suggested to mask bitter taste because the peptides could incorporate into the starch structure and therefore be unavailable to the bitter receptors on the tongue. This approach can reduce bitter taste but the method to make the peptides enter the core of the starch involved heating to 100° C. overnight and therefore the method is not easily scalable (Tamura M. et al. 1990). Acetylation has also been used to reduce bitter taste, however, such processes would result in a new ingredient (acetylated peptide) which would require separate regulatory registration and is considered a more chemical compound and not acceptable for healthy functional foods undergoing a clean label change of ingredients and acetylated peptides would just go the other direction to more chemical ingredients to be labeled. Besides acceptance and efficiency of the bitter taste masking several known methods also change the activity of the masked peptides in a way that they no longer provide the desired bioactivity or loose other desired properties for their respective application.

Objective of the present invention therefore was to provide masked peptides with reduced bitterness and without loss of peptides activity.

Surprisingly it was found that this objective is solved by a peptide which is conjugated with at least one reducing sugar selected from the group consisting of glucose, fructose, maltose, lactose, galactose, cellobiose, glyceraldehyde, ribose xylose and mannose and a degree of conjugation of at least 10% and the conjugated protein only has a Gardner increase of below 6. The degree of conjugation is defined as Degree of conjugation=[OPA-$N_{start}$/Nitrogen$_{start}$)−(OPA-$N_{end}$/Nitrogen$_{end}$)]/(OPA-$N_{start}$/Nitrogen$_{start}$)

OPA-$N_{start}$ is the OPA-N value of hydrolyzed casein without conjugation reaction and OPA-$N_{end}$ is the OPA-N value after conjugation reaction. Nitrogen$_{start}$ is the total nitrogen content in the sample without conjugation reaction while Nitrogen$_{end}$ is the total nitrogen content after conjugation reaction. OPA-N value is divided by the total amount of nitrogen i.e. free amino group divided by total amount of nitrogen from all amino acids. Then the % reduction of this ratio after conjugation is calculated. The ratios are used to account for the dilution effect which occurs when sugar is added to the system therefore both total nitrogen and OPA-N is directly reduced by the dilution. By using the ratios, only the absolute reduction in free amino groups are calculated, thus eliminating the dilution effect of sugar.

The conjugated peptides had lower bitter taste than a combination of peptide and sugar without conjugation process initiated. Therefore, the taste masking is not caused by the sweet taste of sugar but by the specific conjugation reaction. Degree of conjugation was measured as a ratio of conjugated amine groups vs. free amine groups on peptide chain.

According to the invention a process which occurs during food preparation such as baking and frying, called Maillard reaction, was applied. The advantage is that reducing sugars are normally used in many food preparations and Maillard reaction is not changing the peptide in a way, that influences its activity and chemical structure in a way that would require new regulatory registration or declaration. The Maillard reaction is initiated by a condensation of amino groups on peptides with carbonyl groups on reducing sugars, resulting in Schiff base formation and rearrangement to Amadori and Heyns products (Lund M. N. and Ray C. A. 2017). Reducing sugar is any sugar that can act as reducing agent because it has free aldehyde group or free ketone group (Pratt C. W. and Comely K. 2013). The process can be controlled by controlling e.g. pH, temperature and reaction time (Lund M. N. and Ray C. A. 2017). Maillard reaction can be performed in solutions/dispersions or in dry state (Lund M. N. and Ray C. A. 2017). The best strategy is always to have very high concentration of sugars with reducing end and the peptide. According to the invention only the first stage of Maillard reaction is reached and the process was stopped before strong brown color and flavor typical for Maillard reaction is developed.

The degree of conjugation and extend of Maillard reaction are not the same as the degree of conjugation indicates how many amine groups of the peptide are reacting with the sugar whereas the extend of Maillard reaction indicates the stages of Maillard reaction which finally result in development of brown color and various flavors. According to the invention these side flavors are unwanted while and the initial stage of Maillard reaction results in colorless and flavorless conjugation of sugar and peptide. The extend of Maillard reaction can be measured using a Gardner value (see methods part) which determines the presence and extend of brown color development. Because some peptides already have a natural color the increase in Gardner value before vs. after Maillard reaction is used to measure the extend of the Maillard reaction.

According to the invention the reducing sugar is selected from the group consisting of glucose, fructose, maltose, lactose, galactose, cellobiose, glyceraldehyde, ribose xylose and mannose. It is also possible to apply mixtures of reducing sugars, especially those resulting from a starch hydrolysis such as maltodextrin which is comprising different molecules from mono-, di- to oligosaccharides of glucose.

In one embodiment, only a minor increase of Gardner value (Gardner increase) is acceptable and the Gardner increase is below 4, preferably below 3. This means that the according to this embodiment there is no typical Maillard browing of the conjugate mostly associated with a Maillard reaction. It's only the conjugation without the browing and roasted flavour creation.

In a preferred embodiment the degree of conjugation is at least 15%, preferably at least 20%, 25%, 30%, 35% or 40%. Higher degree of conjugation allows higher bitter taste reduction. Degree of necessary and desired reduction of bitterness depends on the individual bitterness of the peptide.

The unconjugated peptides can be either naturally occurring, synthetically made or obtained by acidic, alkaline or enzymatic protein hydrolysis. Preferably the peptide is a protein hydrolysate, preferably originating from plant or animal proteins, particularly at least one selected from the group consisting of wheat, soy, rice, potato, pea, sunflower, rape seed, lupin and milk protein, preferably ist selected from casein and pea protein. The bitterness of each hydrolysate also depends of the way of hydrolysis and the degree of hydrolysis or MW of hydrolysate.

Preferably the peptides are resulting from proteins hydrolyzed by enzymes, particularly by an endopeptidase, preferably an alkaline protease. The way of hydrolysis such as enzymatic or chemical hydrolysis results in different properties of the hydrolysate such as different MW or different peptide properties for hydrolysates of the same MW. Generally, a chemical hydrolysis results in larger MW peptides and enzymatic hydrolysis in more specific and shorter MW peptides.

According to a specific embodiment the protein hydrolysate is unfiltered after hydrolysis and/or pH is neutralized by acids selected from the group consisting of citric acid, phosphoric acid, hydrochloric acid, lactic acid and sulfuric.

According to one embodiment the degree of conjugation is in the range of 10 to 90%, preferably 15 to 70%, more preferably from 20 to 50%, particularly from 25 to 40%. A too high degree of conjugation might result in a darker color or burned or caramelized flavor of the conjugate. The preferred maximum degree of conjugation depends on the individual combinations of sugar and peptide.

In a specific embodiment the maximum molecular weight of the peptide is 2300 Da, preferably 2000, 1500, 1200, 1000 or 900 Da.

In another embodiment the minimum molecular weight of the peptide is 650 Da, preferably 660, 670, 680, 690, 700, 710, 720, 750 or 800 Da.

Preferably the molecular weight of the peptide is between 650 and 2400 Da, preferably between 650 and 1000 Da.

The MW according to the invention is an average apparent MW value determined by measuring OPA-N (Frister H. et al. 1988) as described below in the methods part.

Preferably the molar ratio of reducing sugar to peptide is from 0.5 to 20, preferably from 1.1 to 1.7. For glucose as reducing sugar the weight ratio of peptide to reducing sugar is from 90:10 to 60:40, preferably from 80:20 to 70:30. The higher the amount of sugar is, the lower is the bitterness of the conjugated peptide as more bitter taste causing groups can react with the reducing sugar. Therefore, the amount of sugar is higher for more bitter peptides than for less bitter peptides and will be adjusted depending of the individual bitterness.

Preferably the conjugated peptide is in solid, particulate form, preferably in powder form, particularly in a spray dried or lyophilized form.

Preferably the solubility of the conjugated peptide is at least 90%, preferably at least 91, 92, 93, 94, 95, 95, 97, 98 or 99%, particularly 100%. The solubility of the peptide is an essential feature for many applications as only a dissolved peptide can provide its properties within the application composition The invention further provides a method for masking the bitter taste of a peptide comprising the steps of mixing a peptide and a reducing sugar selected from the group consisting of glucose, fructose, maltose, lactose, galactose, cellobiose, glyceraldehyde, ribose, xylose and mannose, preferably in a solution or dispersion, heating the mixture to perform a Maillard reaction between both components, the Maillard reaction being performed at a temperature between 55 and 90° C., preferably between 60 and 85° C., particularly at 65° C.+/−3° C., and for a time of only 20 to 120 minutes, preferably 30 to 60 minutes, and after that time the Maillard reaction is stopped by spray drying the composition and obtain a powder. Preferably the peptide is a protein which was hydrolyzed.

In an alternative embodiment of the invention the conjugation is performed in the dry state and the mixture consisting powders of peptides and reducing sugar is stored at temperatures between 25-60° C. and elevated relative humidity of 60 to 80% for some days or weeks.

The parameter ranges of the preferred reaction together allow to control reaction not to go to an end product that exhibits no brown color and do not have a caramelized or burned taste (Lund M. N. and Ray C. A. 2017). The brown color and caramelized flavor might be desired in some specific foods but it limits the application and is not favorable for most of applications. The higher the temperature the shorter the time and the lower the temperature the longer the time for the Maillard reaction as can be seen from table 1 to obtain a sufficient reduction of bitterness.

According to the invention method preferably only the first stages of Maillard reaction is reached and the process was stopped before strong brown color is developed.

The method according to the invention is different from the Maillard reaction which occurs during food preparation such as baking directly since the concentration of peptides and reducing sugars in food applications such as e.g. bakery products is not high enough to result in extensive and well controlled reaction on conjugating the peptides and sufficient degree of conjugation of at least 10%.

Preferably the Maillard reaction is performed until a degree of conjugation at least 10%, preferably at least 15%, 20%, 25%, 30%, 35% or 40%, is obtained. The necessary degree of conjugation to sufficiently mask the bitter taste depends on the bitterness of the individual peptide.

The degree of conjugation and extend of Maillard reaction are not the same as the degree of conjugation indicates how many amine groups of the peptide are reacting with the sugar whereas the extend of Maillard reaction indicates the stages of Maillard reaction which finally result in development of brown color and various flavors. According to the invention these side flavors are unwanted while and the initial stage of Maillard reaction results in colorless and flavorless conjugation of sugar and peptide. The extend of Maillard reaction can be measured using a Gardner value (see methods part) which determines the presence and extend of brown color development. Because some peptides already have a natural color the increase in Gardner value before vs. after Maillard reaction is used to measure the extend of the Maillard reaction. According to the invention only a minor increase of Gardner value (Gardner increase) is acceptable. In one embodiment the Gardner increase is below 6, preferably below 4, particularly below 3.

In a preferred embodiment the molar ratio of reducing sugar to peptide is from 0.5 to 2.0, preferably from 1.1 to 1.7.

For glucose as reducing sugar the weight ratio of peptide to reducing sugar is from 90:10 to 60:40, preferably from 80:20 to 70:30. The higher the amount of sugar is, the lower is the bitterness of the conjugated peptide as more bitter taste causing groups can react with the reducing sugar. Therefore, the amount of sugar is higher for more bitter peptides than for less bitter peptides and will be adjusted depending of the individual bitterness.

Preferably the Maillard reaction is performed at a pH from 7 to 9, preferably from 8 to 8.5.

In a preferred embodiment the Maillard reaction is performed in a solution with high concentration of peptides and sugars with reducing end and then spray dried the material to stop the reaction and to form a powder.

Preferably the peptide is a hydrolyzed protein, wherein the hydrolysis is made by enzymes, particularly by an endopeptidase, preferably an alkaline protease. The way of hydrolysis such as enzymatic or chemical hydrolysis results in different properties of the hydrolysate even if the peptides are comprising the same amino acid sequence.

According to a specific embodiment the protein hydrolysate is unfiltered after hydrolysis and/or pH is neutralized by acids selected from the group consisting of citric acid, phosphoric acid, hydrochloric acid, lactic acid and sulfuric.

The invention further provides a method for preparing non-bitter conjugated protein hydrolysate comprising the steps of hydrolyzing at least one protein by at least one enzyme, mixing the resulting protein hydrolysate and at least one reducing sugar selected from the group consisting of glucose, fructose, maltose, lactose, galactose, cellobiose, glyceraldehyde, ribose, xylose and mannose, preferably in a solution or dispersion, heating the mixture to perform a Maillard reaction between both components, the Maillard reaction being performed at a temperature between 55 and 90° C., preferably between 60 and 85° C., particularly at 65° C.+/−3° C., and for a time of only 20 to 120 minutes, preferably 30 to 60 minutes, and after that time the Maillard reaction is stopped by spray drying the composition and to obtain a non-bitter powder of protein hydrolysate.

The parameter ranges of the preferred reaction together allow to control reaction not to go to an end product that exhibits no brown color and do not have a caramelized or burned taste (Lund M. N. and Ray C. A. 2017). The brown color and caramelized flavor might be desired in some specific food but it limits the application and is not favorable for most of applications. The higher the temperature the shorter the time and the lower the temperature the longer the time for the Maillard reaction as can be seen from table 1 to obtain a sufficient reduction of bitterness. According to the invention only the first stage of Maillard reaction is reached and the process was stopped before strong brown color and flavor typical for Maillard reaction is developed.

Preferably the protein is hydrolyzed by an endopeptidase, preferably an alkaline protease. The way of hydrolysis such as enzymatic or chemical hydrolysis results in different properties of the hydrolysate even if the resulting peptides are comprising the same amino acids sequences.

According to a specific embodiment the protein hydrolysate is used without filtering after hydrolysis and/or the pH is neutralized by addition of acids selected from the group consisting of citric acid, phosphoric acid, hydrochloric acid, lactic acid and sulfuric to the hydrolysate.

Preferably the Maillard reaction is performed for sufficient time until a degree of conjugation at least 10%, preferably at least 15%, 20%, 25%, 30%, 35% or 40%, is obtained. The necessary degree of conjugation to sufficiently mask the bitter taste and with that the necessary time and temperature depends on the bitterness of the individual peptide.

Preferably the Maillard reaction is performed at a pH from 7 to 9, preferably from 8 to 8.5.

The degree of conjugation and extend of Maillard reaction are not the same as the degree of conjugation indicates how many amine groups of the peptide are reacting with the sugar whereas the extend of Maillard reaction indicates the stages of Maillard reaction which finally result in development of brown color and various flavors. According to the invention these side flavors are unwanted while and the initial stage of Maillard reaction results in colorless and flavorless conjugation of sugar and peptide. The extend of Maillard reaction can be measured using a Gardner value (see methods part) which determines the presence and extend of brown color development. Because some peptides already have a natural color the increase in Gardner value before vs. after Maillard reaction is used to measure the extend of the Maillard reaction. According to the invention only a minor increase of Gardner value (Gardner increase) is acceptable. In one embodiment the Gardner increase is below 6, preferably below 4, particularly below 3.

In a preferred embodiment the molar ratio of reducing sugar to peptide is from 0.5 to 2.0, preferably from 1.1 to 1.7. For glucose as reducing sugar the weight ratio of peptide to reducing sugar is from 90:10 to 60:40, preferably from 80:20 to 70:30. The higher the amount of sugar is, the lower is the bitterness of the conjugated peptide as more bitter taste causing groups can react with the reducing sugar. Therefore, the amount of sugar is higher for more bitter peptides than for less bitter peptides and will be adjusted depending of the individual bitterness.

In a preferred embodiment the Maillard reaction is performed in a solution with high concentration of peptides and sugars with reducing end and then spray dried the material to stop the reaction and to form a powder.

The invention further provides the use of a conjugated peptide according to the first embodiment of the invention or a conjugated protein hydrolysate obtainable by a process according to the third, above embodiment of the invention for food products, preferably beverages, baking products, chewing gum, sports nutrition, dietary supplements, confectionary, desserts, food foams or prebiotics, for pharmaceutical products, bioactive substances or animal feed products.

EXAMPLES

Results of trials C1 to C6 and P1 show that bitterness can be significantly reduced by conjugating the peptides with reducing sugar. There is a clear correlation between bitterness and degree of conjugation. Higher amount of sugar results in less bitterness and higher reaction temperature results in less bitterness.

TABLE 1

Reaction conditions of conjugation and bitter taste evaluation of conjugates of Casein and pea protein hydrolysates

| Trial Nr | Pea protein hydrolysate (g) | Casein hydrolysate (g) | Glucose (g) | Water (g) | pH | Temp (° C.) | Time (min) | Degree of conjugation (%) | Bitter taste (0-3) | Gardner increase |
|---|---|---|---|---|---|---|---|---|---|---|
| Standard C | — | 100 | N/A | N/A | N/A | N/A | N/A | 0 | 3 | — |
| C1 | — | 70 | 30 | 86 | 8.5 | 65 | 60 | 27.8 | 1.4 | 2.3 |
| C2 | — | 80 | 20 | 98 | 8.5 | 65 | 60 | 20.2 | 1.5 | 1.9 |
| C3 | — | 90 | 10 | 110 | 8.5 | 65 | 60 | 11.3 | 1.9 | 1.2 |
| C5 | — | 80 | 20 | 98 | 8 | 65 | 60 | 20 | 1.5 | — |
| C6 | — | 80 | 20 | 98 | 8.5 | 85 | 30 | 29.8 | 1.4 | 5.8 |
| Standard P | 100 | — | N/A | N/A | N/A | N/A | N/A | 0 | 3 | — |
| P1 | 70 | — | 30 | 86 | 8.5 | 65 | 60 | 24.2 | 1.8 | — |

Protein Hydrolysates 21.15 kg tap water are heated to 60° C. and temperature is kept during the whole hydrolysis time. Add 182 g NaOH as 20% NaOH solution. Disperse 6.93 kg of casein into the warm water and adjust pH to 9.0 using 20% NaOH solution. Add 87 g of Alcalase, stir material for 30 min while slowly adding 10.42 g of casein while pH is kept at 9.0. Add 87 g of Alcalase and keep pH constant at pH 8.5 for 60 min using 20% NaOH solution. Stir for 60 min while the pH is not kept constant during the last 60 min, end pH will be about pH 7.9. Stop enzymatic reaction by heating to 80-84° C. and hold this temperature for 15 min. The solution is spray dried to form a casein hydrolysate powder which was applied for the conjugation.

Pea protein hydrolysate was purchased as commercial product

Conjugation of Peptide 70 to 90 g protein hydrolysate is dissolved in 86 to 110 g water, 10 to 30 g glucose is added to the solution at 65 or 85° C. and pH is adjusted to 8 or 8.5 with NaOH. The system is stirred while pH is kept constant using NaOH. After 30 or 60 minutes the system is spray dried to form powder.

Measurement of Extend of Maillard Reaction (Gardner Increase)

A 5% (w/w) aqueous solution of the peptide and of the conjugated peptide is prepared, the solution is filtered with a 0.2 µm Whatman filter (red rim syringe filter) to remove any turbidity which will interfere with the measurement. The Gardner value is measured using LICO 500 (Hach Lange, Rheineck, Switzerland) with 11 mm cuvette. Measurements is done according to method ISO 4630:2015. The increase in Gardner value is the difference in Gardner value before and after Maillard reaction.

$$Gardner_{Initial} - Gardner_{Mallard} = Gardner\ increase$$

Degree of Conjugation

OPA-N value is divided by the total amount of nitrogen i.e. free amino group divided by total amount of nitrogen from all amino acids. Then the % reduction of this ratio after conjugation is calculated.

$$\text{Degree of conjugation} = [(OPA\text{-}N_{start}/Nitrogen_{start}) - (OPA\text{-}N_{end}/Nitrogen_{end})]/(OPA\text{-}N_{start}/Nitrogen_{start})$$

$OPA\text{-}N_{start}$ is the OPA-N value of hydrolyzed casein without conjugation reaction and $OPA\text{-}N_{end}$ is the OPA-N value after conjugation reaction. $Nitrogen_{start}$ is the total nitrogen content in the sample without conjugation reaction while $Nitrogen_{end}$ is the total nitrogen content after conjugation reaction. The ratios are used to account for the dilution effect which occurs when sugar is added to the system therefore both total nitrogen and OPA-N is directly reduced by the dilution. By using the ratios, only the absolute reduction in free amino groups are calculated, thus eliminating the dilution effect of sugar.

To measure degree of conjugation in a sample where the system before conjugation cannot be measured a HPLC method from Davidek T. et al. (2003) can be utilized.

Nitrogen Content (Dumas)

The protein concentration is analyzed per an ISO standard method (ISO 16634). Samples are converted to gases by heating in a combustion tube which gasifies samples. Interfering components are removed from the resulting gas mixture. The nitrogen compounds in the gas mixture or a representative part of them are converted to molecular nitrogen, which is quantitatively determined by a thermal conductivity detector. The nitrogen content is calculated by a microprocessor. To estimate the protein content based on nitrogen the following factors where used: casein and pea 6.25.

OPA-N

OPA-N value was measured using method developed by Frister H. et al. 1988.

Sensory Evaluation for Bitterness

Samples are tested as 1% peptide solution in water at room temperature using five trained sensory evaluators. To eliminate dilution effect, all Casein hydrolysate samples are adjusted to contain only 1% peptide no matter how much sugar was added. Evaluators are given a standard (non-conjugated hydrolysate) to compare and set that standard to a bitterness of 3. If any change in bitterness can be detected, evaluators give a lower rating for less bitterness and higher rating for higher bitterness. Therefore, lower "bitterness number" means that the system has less bitter taste.

Since the bitterness of casein is higher than pea peptides, the casein standard was dosed at 1% peptide and pea peptides were dosed at 5%. The conjugated peptide was then dosed to contain the same weight of peptide as the standard (thus conjugated peptides where dosed at a higher concentration to account for the dilution effect of the sugar). Therefore, results should be evaluated as a reduction of bitterness compared to the same material without conjugation.

Average Molecular Weight

An average apparent MW value was measured by measuring OPA-N (Frister H. et al. 1988). OPA-N does not give a direct indication of MW but only the amount of end amine groups per sample. An apparent MW value can be gotten by dividing the total amount of nitrogen (total amount of Nitrogen is measured with the Dumas method described above) found with the OPA-N value using the following formula:

$$(Total\ N/OPA\text{-}N)*100 = apparent\ MW$$

Materials

The following materials were used:

NaOH, Sigma-Aldrich (St. Luis Missuri USA), Casein (Acid Casein 741, Fonterra Ltd, Auckland, New Zeeland), Hydrolyzed pea protein, (Peptipea, Triballat ingredients, Cedex France), Glucose (Dextrose Monohydrat, Roquette, Lestrem, France), Alcalase 2.4 L FG, Novozymes (Novozymes A/S, Gagsvaerd, Dennmark), Syringe filter (0.2 μm Whatman Red rim syringe filter, Maidstone, United Kingdom)

REFERENCES

Bumberger E., Belitz H.-D. (1993). Bitter taste of enzymic hydrolysates of casein. Zeitschrift für Lebensmittel Untersuchung and Forschung, v 197, pp 14-19

Davidek T. et al. (2003). Simultaneous quantitative analysis of Maillard reaction precursors and products by high performance anion exchange chromatography. Journal of agricultural and food chemistry, v 51, (25), pp 7259-7265

Frister H., Meisel H., Schlimme E. (1988) OPA method modified by use of N,N-dimethyl-2-mercaptoethylammonium chloride as thiol component. Anal. Chem. V 330, pp 631-633

Hartmann R. and Meisel H. (2007). Food-derived peptides with biological activity: from research to food applications. Current opinion in biotechnology, v 18, pp 163-169.

Lund M. N. and Ray C. A. (2017) Control of Maillard reactions in foods: Strategies and chemical mechanism. Agricultural and food chemistry, v 65, pp 4537-4552.

Pratt C. K. and Cornely K. (2013). Essential biochemistry (third ed.) Wilay pp 626

Tamura M., Mori N., Miyoshi T., Koyama S., Kohri H. and Okai H. (1990). Practical debittering using model peptides and related compounds. Agricultural and biological chemistry, v 54 (1), pp 41-51.

The invention claimed is:

1. Method for masking a bitter taste of a peptide comprising
   mixing a peptide, and a reducing sugar selected from the group consisting of glucose, fructose, maltose, lactose, galactose, cellobiose, glyceraldehyde, ribose, xylose and mannose,
   heating the mixture to perform a Maillard reaction between both components, wherein the Maillard reaction is performed at a temperature between 55 and 90° C. for 20 to 120 minutes, and spray drying the mixture to obtain powder;
   wherein the peptide and the reducing sugar are used in a molar ratio of reducing sugar to peptide of from 1.1 to 1.7;
   wherein the mixture is heated up to a Gardner increase of below 6; and
   wherein the peptide has a molecular weight is between 650 and 2400 Da.

2. Method according to claim 1, wherein the Maillard reaction is performed at a pH from 7 to 9.

3. Method according to claim 1, wherein the Maillard reaction conditions are applied until a degree of conjugation at least 10% is reached.

* * * * *